United States Patent [19]

Vogelsang

[11] 3,973,393

[45] Aug. 10, 1976

[54] RECIPROCATING INTERNAL COMBUSTION ENGINE WITH CONTINUOUS COMBUSTION

[75] Inventor: Gustav Vogelsang, Braunschweig, Germany

[73] Assignee: Volkswagenwerk Aktiengesellschaft, Wolfsburg, Germany

[22] Filed: May 31, 1974

[21] Appl. No.: 475,295

[30] Foreign Application Priority Data

June 22, 1973 Germany ............................ 2331706

[52] U.S. Cl. ................................ 60/39.63; 60/39.6; 123/41.37

[51] Int. Cl.[2] ............................................ F02C 3/00

[58] Field of Search ............... 60/39.6, 39.62, 39.63; 123/41.37

[56] References Cited

UNITED STATES PATENTS

| | | | |
|---|---|---|---|
| 647,651 | 4/1900 | Dow | 60/39.6 |
| 972,504 | 10/1910 | Brown | 60/39.63 |
| 2,227,896 | 1/1941 | Fitzgerald | 60/39.6 |
| 2,396,500 | 3/1946 | Gasser | 123/41.37 |
| 2,407,429 | 9/1946 | Kuttner | 123/41.37 |
| 2,543,758 | 3/1951 | Bodine | 60/39.6 |
| 3,757,748 | 9/1973 | Arney | 123/41.37 |

FOREIGN PATENTS OR APPLICATIONS

| | | | |
|---|---|---|---|
| 371,750 | 1/1907 | France | 60/39.6 |

*Primary Examiner*—Charles J. Myhre
*Assistant Examiner*—Daniel J. O'Connor
*Attorney, Agent, or Firm*—Ernest F. Marmorek

[57] ABSTRACT

A reciprocating internal combustion engine of the type having a continuous combustion. The combustion chamber must be connected with the cylinders of the engine by suitable transfer ports for supplying the gaseous medium to the cylinders and for discharging the burned mixture. In order to obtain a high efficiency the transfer ports should be as short as possible. This is accomplished by utilizing a piston of step-wise construction having a first surface for compressing the gas and a second surface which limits the gas expansion space. This makes it possible to arrange the combustion chamber adjacent to the cylinders between the compression and expansion space.

20 Claims, 2 Drawing Figures

RECIPROCATING INTERNAL COMBUSTION ENGINE WITH CONTINUOUS COMBUSTION

BACKGROUND OF THE INVENTION

This invention relates generally to reciprocating internal combustion engines and particularly relates to such an engine having a continuous combustion.

In engines of this type, the combustion chamber must be connected with the cylinders of the engine by transfer ports for supplying the gaseous medium and for exhausting the burned mixture again.

Such an engine has been disclosed in the U.S. Pat. No. 3,577,729 to warren. This patent disclosed a four cycle internal combustion engine where the working process takes place in two associated separate cylinders. By means of one cylinder, the compression air is sucked in, compressed and pushed over into the combustion chamber at the end of the compression cycle. In the other cylinder, a highly compressed and highly heated exhaust gas is supplied within the range of the upper dead center from the combustion chamber; this gas is then expanded by delivering work and is subsequently pushed out during the next cycle.

The advantage of this known working process consists in that the fuel added to the compressed air in the combustion chamber can be completely burned during a continuous burning process with a stationary flame. Therefore, the amount of injurious material of the exhaust gases leaving the engine is relatively low. Therefore, this process is particularly suited for use with automotive vehicles where continuously higher demands are made concerning the freedom from injurious materials of the exhaust gas in order to maintain clean air. These demands for conventional internal combustion engines with their discontinuous burning can be only achieved with difficulty and with considerable equipment.

However, it has been found that the efficiency of these known internal combustion engines which operate with a continuous combustion depends essentially upon the heat losses which occur in the transfer ports between the combustion chamber and the cylinders of the engine. If it is desired to obtain with this engine an output comparable to that of conventional internal combustion engines, the necessary demand is that these transfer ports must be made as short as possible.

It is accordingly an object of the present invention to provide a reciprocating internal combustion engine which operates with the continuous combustion in the manner explained hereinabove and which provides a high efficiency.

SUMMARY OF THE INVENTION

In accordance with the present invention, this object is obtained for a reciprocating internal combustion engine of the type discussed herein in that each cylinder is associated with a piston of step-wise construction. The piston has a first face which defines a compression space and has a second face which defines an expansion space. The step-wise construction of the piston in accordance with the present invention makes it possible to arrange both working spaces in one cylinder even while separating the compression and the expansion spaces. In this manner, it is possible to equalize the flow losses which occur in the transfer ports by a corresponding of the faces by selecting the volume of the compression space larger than that of the expansion space. This differential size of the working spaces does not require a change of the mass relationship of the reciprocating piston driving gear as distinguished from the known arrangement.

In order to withstand the high temperatures within the expansion space, it is suitable to cool the inner surface of the piston at least in this range. This may be accomplished by spraying the inner surface of the piston with a cooling means whereby compressed oil may be utilized as a cooling means, the oil flowing out of nozzles or openings at the end of the connecting rod opposite the crank shaft.

According to a further feature of the invention, the combustion chamber is disposed laterally adjacent to the cylinders within the region between the compression and the expansion space. This arrangement yields very short transfer ports between the combustion chamber and the working spaces so that heat losses in the channels remain relatively small. According to a preferred embodiment of the invention, the combustion chamber is provided with a housing of generally egg-shape and of rotational symmetrical form, the lower end of which has a larger cross-section. At this end, there is provided a pot-shaped open housing dish which limits the ignition chamber and which contains a fuel supply and an ignition device. The pot-shaped housing dish may be provided at its circumference with cutouts in order to obtain an intimate and good misture of the supplied compressed air with the injected fuel, the cutouts permitting an essentially tangentially directed air flow into the ignition chamber. Finally, in order to maintain a stationary flame, a flame-containing sheet metal insert may be disposed at the open end of the pot-shaped housing dish.

A further embodiment of the invention is provided with means for controlling the gas exchange between the compression space and the combustion chamber. To this end, there may be provided in the transfer port between the compression chamber and the combustion chamber a poppet valve which is freely movable between a seat and a stop. The poppet valve is opened within the range of the upper dead center of the piston by the compression pressure against the pressure of the combustion chamber. In order to prevent that this valve, which is operated by pressure control, develops too much noise and is subject to too high a load, it is guided according to a further extension of the invention to dampen its impact in both directions. To this end, the poppet valve may be held at the side facing the compression space with its central shaft in a dead end bore in the cylinder housing which is connected with the compression space when the valve is opened by a lateral bore. At the other side, that is facing the combustion chamber, the piston valve is held by a stem secured to a stop which moves into a dead end bore disposed at the poppet valve. Due to this construction for which at both sides of the poppet valve there are provided stem-like elements which move into dead end bores, a compression of the gas volumes enclosed in the dead end bores reduces the impact velocity and dampens the impact.

Instead of the freely movable valve disposed in the transfer port, the control of the gas exchange may also be obtained by other means. According to another suggestion of the invention, it is feasible to provide at the piston an annular transfer space connected with the compression space by means of connecting bores. The exit openings leading toward the piston wall correspond in the range of the upper dead center of the piston with transfer ports in the cylinder leading toward the combustion chamber. In this case, the gas exchange is caused by a slit control. In order to prevent a substantial flow of the gas in the reverse direction, that is from the combustion chamber into the compression space, means are provided in accordance with the present invention for increasing the resistance to flow for this reverse current. To this end, it is proposed that the transfer port expands in the direction of the combustion chamber in the manner of a diffuser and that the limiting walls of the transfer space are arranged in such a manner that gas flowing backwards is caused to whirl. It is particularly suitable when the limiting wall of the connecting bores to the compression chamber of the transfer space is provided with projections facing the reverse current.

These projections provide edges which tear off the flow and thus cause the formation of whirls in the reverse current and thereby prevent that a direct unobstructing flow of current is possible from the combustion chamber through the transfer port into the transfer space in the compression chamber.

The novel features that are considered characteristic of this invention are set forth with particularity in the appended claims. The invention itself however, both as to its organization and method of operation, as well as additional objects and advantages thereof, will best be understood from the following description when read in connection with the accompanying drawings

DESCRIPTION OF THE PREFERRED EMBODIMENTS

Figure 1:
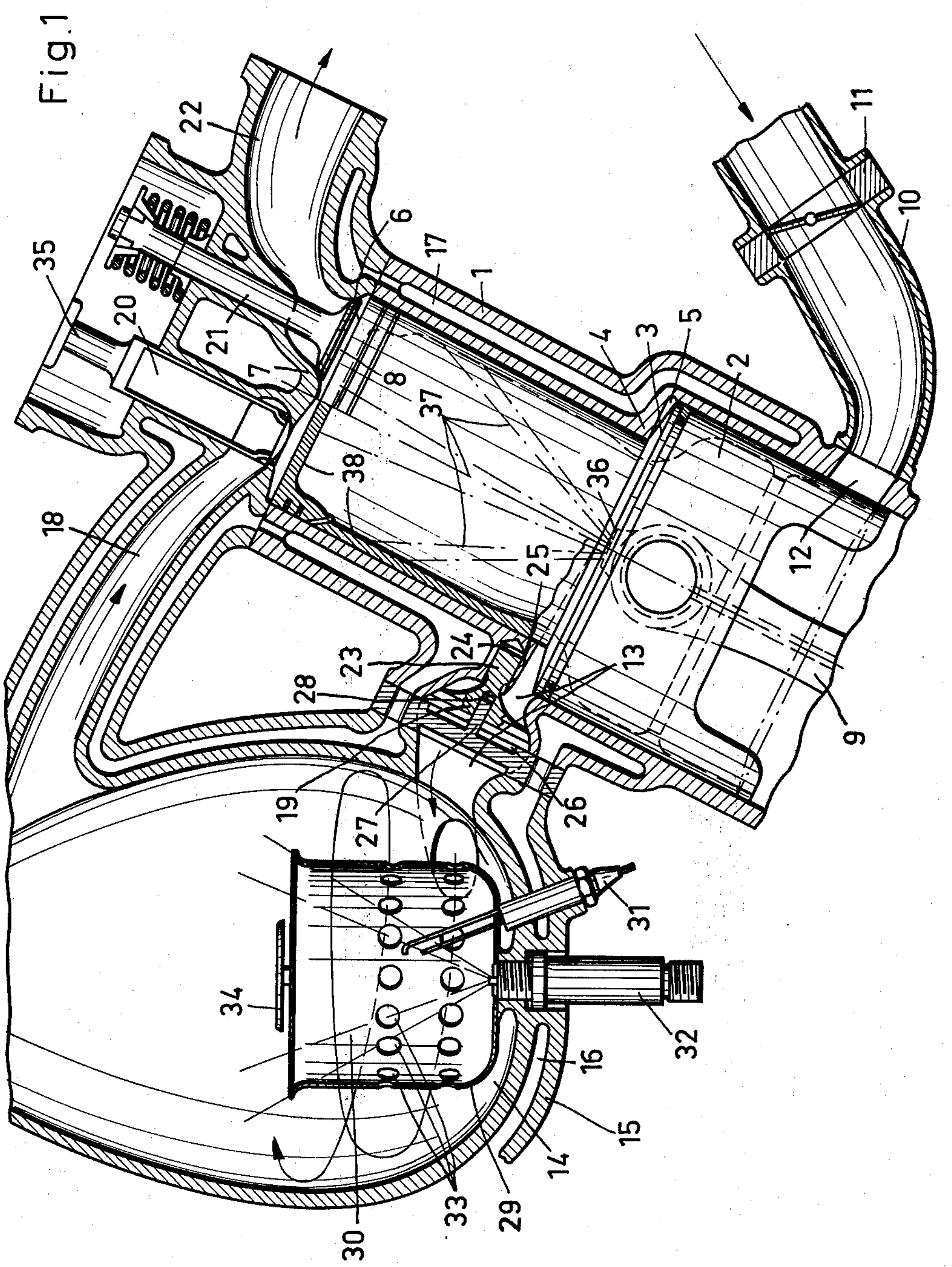
FIG. 1 is a longitudinal sectional view of a cylinder and a combustion chamber of a reciprocating internal combustion engine having a continuous combustion.

Referring now to FIG. 1, there is illustrated a two-cycle internal combustion engine having a cylinder 1 in which reciprocates a piston 2. The piston 2 is of stepwise construction and is provided with a first annular surface 3 which encloses together with a step 4 at the cylinder 1 a working space 5 which operates as the compression space. The second face 6 of the piston 2 defines with respect to a cylinder or valve head 7 a seconding working space 8 having a variable volume and which serves as the expansion space.

The drawing illustrates only one of many cylinders which are preferably disposed in V shape. The individual cylinders all have the same construction and therefore it is not deemed to be necessary to illustrate or describe more than one cylinder. The pistons 2 of the various cylinders are connected by means of a connecting rod 9 with a common crank shaft not illustrated.

Within the region of the lower dead center of the piston stroke, the annular piston face 3 operating as a compression piston frees an inlet opening 12 through which compressed air is sucked in from an inlet channel 10. In the inlet channel there may be disposed, for example, a throttle valve 11 for controlling the air supply.

The compression space 5 may be connected by a transfer port 13 with a combustion chamber 14 common to all the cylinders of the engine and disposed laterally adjacent cylinder 1. The combustion chamber 14 is provided with a housing 15 which is rotationally symmetrical and is of approximately egg shape. The housing 15 is double-walled and is provided with a cooling jacket 16 which is connected with the cooling liquid jacket 17 of the cylinder as well as with a liquid jacket of the valve head 7 which is not further described. By means of a transfer port 18, the combustion chamber 14 is connected with the expansion chamber 8.

In order to control the gas exchange between the compression space 5, the combustion chamber 14 and the expansion space 8, there is provided a freely movable poppet valve 14 disposed in the transfer port 13 as well as a hot gas valve 20 disposed at the end of the transfer port 18 in front of the expansion chamber. An outlet or exhaust valve 21 extends into the expansion chamber 8 and controls the exhaust of the expanded gases by means of an exhaust channel 22.

The hot gas valve 20 and the exhaust valve 21 are controlled in a manner known for conventional motors. However, it may be advantageous if at least the hot gas valve 20 is positively controlled. To this end, for example, the valve 20 which may be arranged as a hollow piston and filled with a cooling medium is provided at its outer end with a recess 35 which cooperates with a fork-shaped double rocking lever for the positive control. The poppet valve 19 disposed in the transfer port 13 is only controlled by the pressure difference which results during the stroke of the step piston 2 between the compression space 5 and the combustion chamber 14. As long as the pressure in the combustion chamber 14 is greater than that in the compression space 5 the poppet valve 19 is in the position shown in the drawing where it seats on its seat and blocks the transfer port 13. However, if the pressure in the compression space 5 increases the poppet valve opens whereby it seats on a stem 26 which is cooled by a liquid and which extends through the transfer port 13.

In order to avoid a hard and noisy impact of the poppet valve in its two end positions, it is guided to dampen its impact in both directions. To this end there serves a central valve shaft 23 disposed at the poppet valve which moves like a piston at the side of the compression chamber 5 in a deadend bore 24 of the cylinder 1. This causes a compression of the air volume enclosed in the deadend bore whereby the impact velocity of the poppet valve is reduced or delayed. In order to fill the air cushion which operates as an air spring there is provided a lateral bore 25 which is freed by the valve shaft 23 when the valve 19 is opened and which connects the deadend bore with the compression space 3.

On the other side of the valve 19 a similar damping effect is obtained by a plunger 27 disposed at the central stem 26 which moves when the valve 19 is opened into a deadend bore 28 disposed at the poppet valve.

The transfer port 13 issues in an essential tangetial direction into the double-walled housing 15 of the combustion chamber 14 so that the air which flows through the transfer port 13 into the combustion engine makes a rotary motion about the longitudinal axis of the combustion chamber 14. Within the range of the lower end of the egg-shaped housing 15 having a larger cross-section the combustion chamber 14 is provided with an ignition chamber. The ignition chamber is limited by a pot-shaped housing dish 29 which is opened toward the combustion chamber into which issues a combustion device and a fuel inlet device 32. The housing dish is provided at its circumference with cutouts 33 to permit air from the combustion chamber 14 to enter. At the open end of the pot-shaped housing dish 29 there is disposed a flame containing sheet metal insert 34 which guarantees a stable stationary flame after the starting process has been terminated.

The end 36 of the connecting rod 9 opposite the crank shaft is provided with nozzles or openings through which compressed oil may be injected in a conical spray 37 for cooling the inner surface of the stepped piston 2 within the range of the expansion chamber 8. This compressed oil may be moved by means of longitudinal bores in the connecting rod to the connecting rod head 36.

Subsequently the operation of the reciprocating internal combustion engine will be explained by means of a working cycle. Essentially when the stepped piston moves down the inlet opening 12 is opened within the range of the lower dead center point by the annular compression piston 3. Accordingly fresh air is sucked into the compression space 5 through the inlet channel 10. When the step piston 2 moves upwards the annular compression piston 3 compresses the sucked in air until a few degrees ahead of the upper dead center point the compression pressure equals the pressure in the combustion chamber 14. At this moment the poppet valve 19 opens the transfer port 13 so that during the further motion of the compression piston 3 the compressed air is pushed over from the compression space 5 into the combustion chamber 14. The pushing over of the compressed fresh air is terminated at or shortly after the upper dead center point of the compression piston in that the gas pressure present in the combustion chamber 14 presses back the poppet valve 19 towards its seat. In order to prevent during opening and closing of the poppet valve 19 a hard impact of the valve head, the previously described gas damping is provided at both sides of the valve.

The highly compressed combustion air flows tangentially from the transfer port 13 into the combustion chamber 14 and there forms an air whirl, a small portion of which penetrates through the centrally disposed housing dish 24 and its cutouts 33 into the ignition chamber 30. The air which flows into the ignition chamber 30 moves also the fuel stream of one or several of the injection nozzles of the fuel supply device 33 causing a whirl thereof and thereby forms a fuel-rich fuel air misture which can readily be ignited. During start and the initial cold running of the combustion engine this mixture is ignited by means of an ignition device 31 which in the example illustrated may be formed by a high voltage spark plug; however it may also consist of a glow spiral or a preglow member. The auxiliary ignition must only be maintained until the flame container 34, which partially covers the ignition chamber 30, guarantees self ignition and a stable flame.

In the intermediate region of the combustion chamber 14 which is rotationally symmetrical and preferably of egg shage, the main portion of the rotating air mixes with the burning gases issuing from the ignition chamber. This guarantees a complete combustion of the fuel whereby the percentage of injurious material in the exhaust gas is an absolute minimum.

The combustion chamber housing 15 of egg shape is disposed laterally adjacent the cylinders 1 approximately within the region between the compression space 5 and the expansion space 8. This makes it possible to have a short and small volume transfer port 13 between the compression space 5 and the combustion chamber 14 which is very favorable with respect to efficiency.

The highly compressed, highly heated combustion gases now flow through the transfer port 18 into the expansion chamber 8 under the control of a valve or a rotary slide valve. Here the combustion gases expand and press the step piston 2 into its lower dead center. While the step piston 2 moves downwardly the exhaust valve 21 opens which may be controlled in a known manner by a cam so that the exhaust gases flow through the exhaust channel 22 to the outside.

Because the hot gas inlet valve 20 is only open for a short period and in order to avoid loss of time it must be opened and closed very fast. Therefore, this valve is suitably positively controlled, that is desmodromically. As shown in FIG. 1, at the outer end of the valve 20, there is provided a recess into which extends a fork-shaped double rocking lever for the positive control. In order to withstand the high temperature load the valve 20 is made of a highly heat resistant material and may be made in the form of a hollow cylinder filled with a suitable cooling means such, for example, as salt. In order to cool the piston surface 6 which is also highly stressed by heat, there may be used the pressure oil which is sprayed against the inner surface of the piston, the oil flowing through corresponding nozzles in the connecting rod head 36.

It is also feasible to cause the inlet channel 10 to open directly within the range of the upper dead center of the step piston into the compression chamber. However, in this case there must be provided a valve control. In any case by means of the special arrangement of the piston constructed in steps and having one surface providing a compression space and another surface limiting an expansion space, during the two cycles, that is during the up and downward stroke of the piston fresh air is sucked in by the compression piston, compressed and pushed over into the combustion chamber. At the same time in the expansion space 8 the combustion gas which exists under high temperature and high pressure is admitted from the combustion chamber 14, expanded and finally pushed out. It should be particularly noted that the construction of the piston in steps in accordance with the present invention also presents the possibility to make the two piston surfaces of different sizes so that, for example, the compression space has a larger volume than that of the expansion space. By this differential size of the two operating spaces the losses of the gas flow which are caused in the transfer ports 13 and 18 and in the combustion chamber 14 may be equalized.

Figure 2:
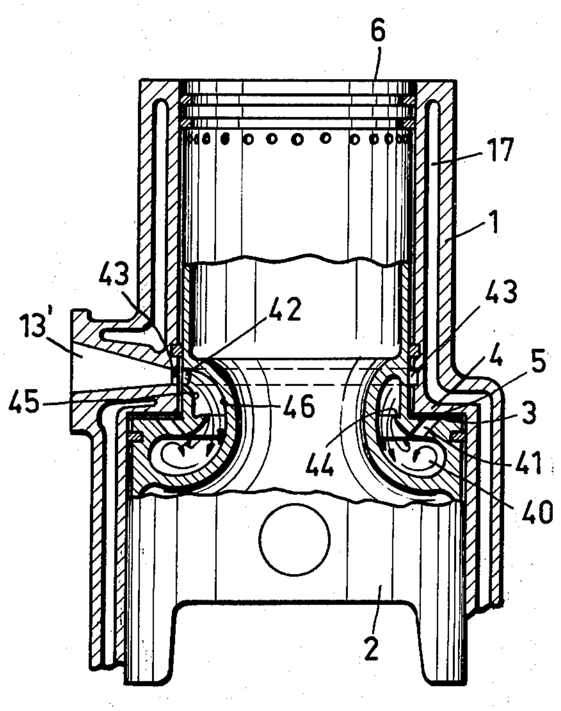
FIG. 2 is a longitudinal sectional view of a piston and cylinder of another embodiment of the invention where the transfer stream from the compression space into the combustion chamber is slit controlled.

FIG. 2 to which reference is now made shows another possibility for controlling the pushing over of the compressed air from the compression chamber 5 into the combustion chamber 14. To this end the step piston 2 is provided in the region of the annular surface 3 which operates as a compression piston with an annular transfer space 40 which is connected with the compression space 5 by several bores 41. The transfer space 40 has limiting walls 45 and 46 which are rotationally symmetrical and which show an arc-shaped longitudinal section. The space 40 is provided with one or more exit slits 42 disposed at the outer circumference of the piston shaft of the expansion piston 6 which correspond during the upper dead center of the step piston 2 with the annular channel 43 connected with the transfer port 13'. During the compression stroke highly compressed air is pushed over the small inclined bores 41 in the transfer space and expands in the region of the upper dead center by means of the exit slit 42, the annular channel 43 and the transfer port 13' into the combustion chamber not illustrated in FIG. 2.

The essential feature of the construction illustrated in FIG. 2 is that by means of the special arrangement of the transfer port 13' and the limiting walls of the transfer space 40 a large portion of the gases which when the step piston 2 moves down incline to flow back from the combustion chamber are prevented therefrom by the formation of whirls to flow back into the compression space. This reverse current block is achieved in that the resistance to the flow of the medium at the limiting walls is essentially larger than for the flow toward the combustion chamber. This increase of the resistance for the reverse current flow is achieved, for example, by the transfer port 13 which becomes small in this direction and by the whirl generating shape of the limiting walls 45 and 46 of the transfer space 40. Particularly the projection 44 provided at the limit wall 44 and opposing the reverse flow causes an essential increase of the resistance to the reverse current flow. This is due to the fact that the flow adjacent the wall tears off by forming whirls and forces the profile of the flow toward the opposite limiting wall 46. In this manner it is achieved that the flow cannot find a direct way from the exit slit 42 to the inclined bores 41 so that the reverse current loss without the necessity to provide a special valve in the transfer port between the compression space and the combustion chamber can be maintained within small and tolerable limits. This current block needs to maintain its effect as long as the exit slit 42 is in communication with the annular space 43. Therefore, it is suitable to make the axial height of the exit slits 42 so small as can be conveniently manufactured. Finally, it may be suitable to make the transfer space 40 not exactly rotationally symmetrical but to make it smaller from the region of the exit slit as viewed in the direction of the circumference to the diammetrically opposite point.

Instead of the pressure oil spray of the inner wall of the step piston illustrated in FIG. 1 by means of the nozzles disposed in the connecting rod head, an effective cooling of the operating piston can also be achieved by means of known oil stream nozzles which are fixedly secured to the crank shaft housing. These oil stream nozzles continuously spray oil upon the inner surface of the oscillating pistons or in specially arranged oil inlet channels in the interior of the piston bottom.

What is claimed is:

1. A reciprocating internal combustion engine with continuous combusting, said engine comprising, in combination:

a cylinder;

a piston slidable in said cylinder and having an upper dead center and having a stepwise construction, said piston having a first annular face means defining a compression space operable for sucking in and compressing an air volume and having a second face means defining an expansion space operable for expanding and pushing out an exhaust gas volume;

a combustion chamber defined in said engine, said combustion chamber including pump means operable for adding fuel to said compressed air volume to produce an ignitable fuel-air-mixture and igniting means operable for igniting said fuel-air-mixture and for maintaining a continuously burning flame;

a first transfer conduit means for conveying said compressed air volume to said combustion chamber; and a second transfer conduit means for conveying said exhaust gas volume from said combustion chamber to said expansion space;

the above comprising means whereby within the range of the upper dead center of said piston, said compressed air volume is conveyed from said compression space by said first transfer conduit to said combustion chamber and at substantially the same time said exhaust gas volume of equivalent size is supplied from said combustion chamber by said second transfer conduit to said expansion space.

2. Engine as defined in claim 1 wherein the areas of said two piston face means are unequal.

3. Engine as defined in claim 2, wherein said first annular face means has a larger area than that of said second face.

4. Engine as defined in claim 1 wherein the inner surface of said piston is cooled within the range of said second face means defining said expansion space.

5. Engine as defined in claim 4, wherein the inner surface of said piston is supplied with a cooling means.

6. Engine as defined in claim 5, wherein compressed oil is used as the cooling means, said piston including connecting rod, the inner portion of said connecting rod away from the crank shaft being provided with nozzles for supplying said oil.

7. Engine as defined in claim 1 wherein said combustion chamber is disposed laterally adjacent to said cylinder in the region between said compression space and said expansion space.

8. Engine as defined in claim 1 wherein means are provided for controlling the gas exchange between said compression space and said combustion chamber.

9. Engine as defined in claim 8, wherein a freely movable poppet valve is disposed in said first transfer conduit port between said compression space and said combustion chamber, said poppet valve being freely movable between its seat and a stop, said poppet valve being operable to be opened within the region of the upper dead center of said piston by the compression pressure in said compression space against the pressure in said combustion chamber.

10. Engine as defined in claim 9, wherein means are provided for damping the impact of said poppet valve at both ends of its travel.

11. Engine as defined in claim 10, wherein said poppet valve is held at the side facing said compression space by the provision of a center valve shaft movable in a deadend bore disposed in said cylinder and wherein a lateral bore connects with said compression chamber when said valve is in the open position.

12. Engine as defined in claim 10, wherein said poppet valve is held at the side facing said combustion chamber by a plunger secured to a stop, said plunger penetrating into a dead end bore in said poppet valve.

13. Engine as defined in claim 8, wherein an annular transfer space is provided at said piston connected with said compression chamber by connecting bores, said transfer space having exit openings extending through the wall of said piston, said exit openings corresponding to said transfer port of said cylinder within the range of the upper dead center of said piston, said transfer port communicating with said combustion chamber.

14. Engine as defined in claim 13, wherein means are provided for increasing the resistance to gas flow for a reverse flow from said combustion chamber into said compression space.

15. Engine as defined in claim 14, wherein said transfer port has a diffuser like shape and an increasing diameter in the direction toward said combustion chamber.

16. Engine as defined in claim 14, wherein the limiting walls of said transfer space are arranged in such a manner that gas flowing in the reverse direction is caused to whirl.

17. Engine as defined in claim 16, wherein the limiting wall of said transfer space between the connecting bores to said compression space is provided with projections opposing the reverse flow of gas.

18. A reciprocating internal combustion engine with continuous combusting, said engine comprising, in combustion:

a cylinder;

a piston slidable in said cylinder and having an upper dead center and having a stepwise construction, said piston having a first annular face means defining a compression space operable for sucking in and compressing an air volume and having a second face means defining an expansion space operable for expanding and pushing out an exhaust gas volume;

a combustion chamber defined in said engine, said combustion chamber including pump means operable for adding fuel to said compressed air volume to produce an ignitable fuel-air-mixture and igniting means operable for igniting said fuel-air-mixture and for maintaining a continuously burning flame;

a first transfer conduit means for conveying said compressed air volume to said combustion chamber; and a second transfer conduit means for conveying said exhaust gas volume from said combustion chamber to said expansion space;

the above comprising means whereby within the range of the upper dead center of the piston said compressed air volume is conveyed from said compression space by said first transfer conduit to said combustion chamber and at the same time said exhaust gas volume of equivalent size is supplied from said combustion chamber by said second transfer conduit to said expansion space;

said combustion chamber including a housing of generally egg shape and rotationally symmetrical, the lower end of said housing having a larger cross-section than the other end and an open housing dish of generally pot shape disposed at said end having the larger cross-section to define an ignition chamber, and a fuel supply and said igniting means disposed in said ignition chamber.

19. Engine as defined in claim 18, wherein said housing dish is provided with cutouts at its circumference to permit entry of compressed air into said ignition chamber in an essentially tangential direction.

20. Engine as defined in claim 18, wherein a flame containing sheet metal insert is disposed at the open end of said housing dish.

* * * * *